United States Patent
Bilek et al.

(10) Patent No.: US 11,408,975 B2
(45) Date of Patent: Aug. 9, 2022

(54) DISPLAY DEVICE FOR VERTICAL PRESENTATION OF FORECAST WEATHER

(71) Applicant: HONEYWELL INTERNATIONAL INC., Morris Plains, NJ (US)

(72) Inventors: Jan Bilek, Brno (CZ); Zdenek Eichler, Olomouc (CZ); Melissa Ziarnick, Anthem, AZ (US); Anup Raje, Karnataka (IN); Pamela Mannon, Snohomish, WA (US); Don Moldenhauer, Maple Grove, MN (US); Ratan Khatwa, Sammamish, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 569 days.

(21) Appl. No.: 15/594,948

(22) Filed: May 15, 2017

(65) Prior Publication Data

US 2018/0074167 A1 Mar. 15, 2018

(30) Foreign Application Priority Data

Sep. 14, 2016 (IN) .............................. 201611031329

(51) Int. Cl.
*G01S 7/18* (2006.01)
*G01S 7/20* (2006.01)
(Continued)

(52) U.S. Cl.
CPC ...... *G01S 7/18* (2013.01); *G01S 7/20* (2013.01); *G01S 7/22* (2013.01); *G01S 7/24* (2013.01);
(Continued)

(58) Field of Classification Search
CPC ........ F01W 1/10; G01S 13/86; G08G 1/0967; G06N 99/005
See application file for complete search history.

(56) References Cited

U.S. PATENT DOCUMENTS 6,199,008 B1 3/2001 Aratow et al.
6,839,018 B2 * 1/2005 Szeto ...................... G01S 7/046
342/26 R
(Continued)

FOREIGN PATENT DOCUMENTS

CN 102682194 A 9/2012

OTHER PUBLICATIONS

Extended EP Search Report for Application No. 17190171.3 dated Feb. 19, 2018.
(Continued)

*Primary Examiner* — Catherine T. Rastovski
(74) *Attorney, Agent, or Firm* — Lorenz & Kopf, LLP (57) ABSTRACT

An apparatus and method for receiving and processing weather data and flight plan data is disclosed. The apparatus includes a first display, an input unit, and a processor. The processor is configured to receive flight plan data and weather data, and to determine, based on the weather data, which weather characteristics is located within a predetermined range of a predetermined flight altitude value. The processor is further configured to instruct the first display to display those weather data which are located within the predetermined range above and below the input flight altitude value together with the flight plan data, and to instruct the first display to additionally display at least one element of the group consisting of the elements: strategic information weather, uplink weather, weather information from external weather data provider, onboard weather radar information, notice to airmen, aeronautical information service data, terminal area forecast, air-traffic related information.

9 Claims, 7 Drawing Sheets

(51) Int. Cl.
*G01S 13/95* (2006.01)
*G01S 7/22* (2006.01)
*G01S 7/24* (2006.01)
*G01W 1/06* (2006.01)
*G06F 3/147* (2006.01)
*G01S 7/00* (2006.01)

(52) U.S. Cl.
CPC .............. *G01S 13/953* (2013.01); *G01W 1/06* (2013.01); *G06F 3/147* (2013.01); *G01S 7/003* (2013.01); *G01S 13/95* (2013.01); *G01S 13/951* (2013.01); *Y02A 90/10* (2018.01)

(56) References Cited

U.S. PATENT DOCUMENTS

| | | |
|---|---|---|
| 8,130,121 B2 | 3/2012 | Smith et al. |
| 9,153,137 B2 | 10/2015 | Hankers et al. |
| 9,234,982 B2 | 1/2016 | Ramaiah et al. |
| 9,244,167 B1* | 1/2016 | Oransky ............... G01S 13/953 |
| 2009/0267800 A1* | 10/2009 | Hammack .............. G01C 23/00 701/8 |
| 2010/0057275 A1 | 3/2010 | Schilke et al. |
| 2011/0276198 A1 | 11/2011 | Khatwa et al. |
| 2011/0301842 A1* | 12/2011 | Krupansky ............ G01C 21/00 701/411 |
| 2014/0039734 A1 | 2/2014 | Ramaiah et al. |
| 2014/0354455 A1 | 12/2014 | Samuthirapandian et al. |
| 2016/0041305 A1* | 2/2016 | Stulken .................. G01W 1/10 340/977 |

OTHER PUBLICATIONS

Bergqvist, P; Garmin App Makes Significant Updates to Pilot GPS; New views, ADS-B connections and international VFR charts added; Flying; Feb. 25, 2016.

* cited by examiner

DISPLAY DEVICE FOR VERTICAL PRESENTATION OF FORECAST WEATHER

CROSS-REFERENCE TO RELATED APPLICATION

This application claims priority to India Provisional Patent Application No. 201611031329 filed Sep. 14, 2016.

TECHNICAL FIELD

The disclosure generally relates to receiving and processing weather data and flight plan data of an aircraft. In particular, the disclosure relates to a display device for receiving and processing weather data and flight plan data, to an aircraft with such a display device, and to a method for receiving and processing weather data and flight plan data in an aircraft.

BACKGROUND

During flight of an aircraft, information about weather conditions ahead of the current position and along a planned moving path of the aircraft may be crucial for operating procedures aboard the aircraft. Especially, detailed knowledge about weather data ahead of an aircraft and the moving path of the aircraft may be helpful for operating procedures aboard the aircraft.

The vertical situation display (VSD) provides a strategic and tactical, vertical presentation of flight path information in relation to terrain. For example, the VSD is presented in a portion of the Integrated Navigation (INAV) display in the cockpit of an aircraft.

Typically, the VSD maintains a constant aspect ratio at lower ranges to allow the pilot to see the flight plan or path in relation to terrain or sea level. This configuration leads to a Y-axis (vertical axis) scale that is predetermined and cannot be adjusted by the flight crew. Similarly, at higher ranges, the VSD manages its vertical scale to cover the altitude constraint of the highest waypoint in flight plan. This again leads to a Y-axis scale that cannot be adjusted by the flight crew. The X-axis (horizontal axis) range scale may be adjusted and is tied to the same range values presented on the lateral portion of the INAV.

A predetermined and/or static aspect ratio and highest waypoint coverage in the Y-axis may lead to difficulty representing uplink forecast weather in the vertical profile. Uplink forecast weather data such as that for clear air turbulence (CAT) is provided by flight level (FL) groups, but if the altitude restrictions of VSD vertical scale is maintained, the data appears as small rectangular blocks scattered across the VSD view, thus making it difficult for a human operator, e.g. the pilot, to discern details regarding the weather phenomena indicated at the VSD.

As such, it is desirable to provide a strategic weather outlook that can assist the pilot in flight path adjustments over the course of a long flight. This may allow the pilot to view vertical forecast weather within a predetermined range of an altitude window that may be adjusted up or down so as to gather more detailed weather information that may assist the pilot in decisions to request flight level changes.

In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of a processing unit for receiving and processing weather data and flight plan data, an aircraft with such a processing unit, and a method for receiving and processing weather data and flight plan data are disclosed herein.

In a first non-limiting embodiment, a display device for receiving and processing weather data and flight plan data is provided. The display device comprises a first display, configured to display weather data and flight plan data, an input unit, configured to receive an input value from an operator, wherein the input value is a flight altitude value, and a processor. The processor is configured to receive flight plan data containing at least a moving path of an aircraft, to receive weather data containing at least positional information and weather characteristics belonging to said positional information, to determine, based on the positional information of the weather data, which weather characteristics is located within a predetermined range of the input flight altitude value, to instruct the first display to display those weather data which are located within the predetermined range above and below the input flight altitude value together with the flight plan data, and to instruct the first display to additionally display at least one element of the group consisting of the elements: strategic information weather, uplink weather, weather information from external weather data provider, onboard weather radar information, notice to airmen, aeronautical information service data, terminal area forecast, air-traffic related information.

In a second non-limiting embodiment, an aircraft is provided, comprising a display device for receiving and processing weather data and flight plan data, the display device comprising: a first display, configured to display weather data and flight plan data, an input unit, configured to receive an input value from an operator, wherein the input value is a flight altitude value, and a processor. The processor is configured to: receive flight plan data containing at least a moving path of an aircraft, to receive weather data containing at least positional information and weather characteristics belonging to said positional information, to determine, based on the positional information of the weather data, which weather characteristics is located within a predetermined range of the input flight altitude value, to instruct the first display to display those weather data which are located within the predetermined range above and below the input flight altitude value together with the flight plan data, and to instruct the first display to additionally display at least one element of the group consisting of the elements: strategic information weather, uplink weather, weather information from external weather data provider, onboard weather radar information, notice to airmen, aeronautical information service data, terminal area forecast, air-traffic related information.

In a third non-limiting embodiment, a method for processing and displaying weather data and flight plan data in an aircraft is provided. The method comprises the following steps: receiving an input value that is a flight altitude value; receiving flight plan data containing at least a moving path of an aircraft; receiving weather data containing at least positional information and weather characteristics belonging to said positional information; determining, based on the positional information of the weather data, which weather characteristics is located within a predetermined range of the input flight altitude value; instructing a display to display those weather data which are located within the predetermined range above and below the input flight altitude value together with the flight plan data; and instructing the display to additionally display at least one element of the group consisting of the elements: strategic information weather, uplink weather, weather information from external weather data provider, onboard weather radar information, notice to airmen, aeronautical information service data, terminal area forecast, air-traffic related information.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computer systems and other functional aspects of a computer system (and the individual operating components of the computer system) may not be described in detail herein. Furthermore, the connecting lines shown in the various figures contained herein are intended to represent example functional relationships and/or physical and/or mechanical couplings between the various elements. It should be noted that many alternative or additional functional relationships or physical connections may be present in an embodiment of the disclosure.

Generally speaking, the system and method described herein and with reference to the following drawings provide an interactive vertical presentation of weather, flight plan, and own-ship in a manner that enhances awareness of forecast weather locations and aids strategic flight planning.

Figure 1:
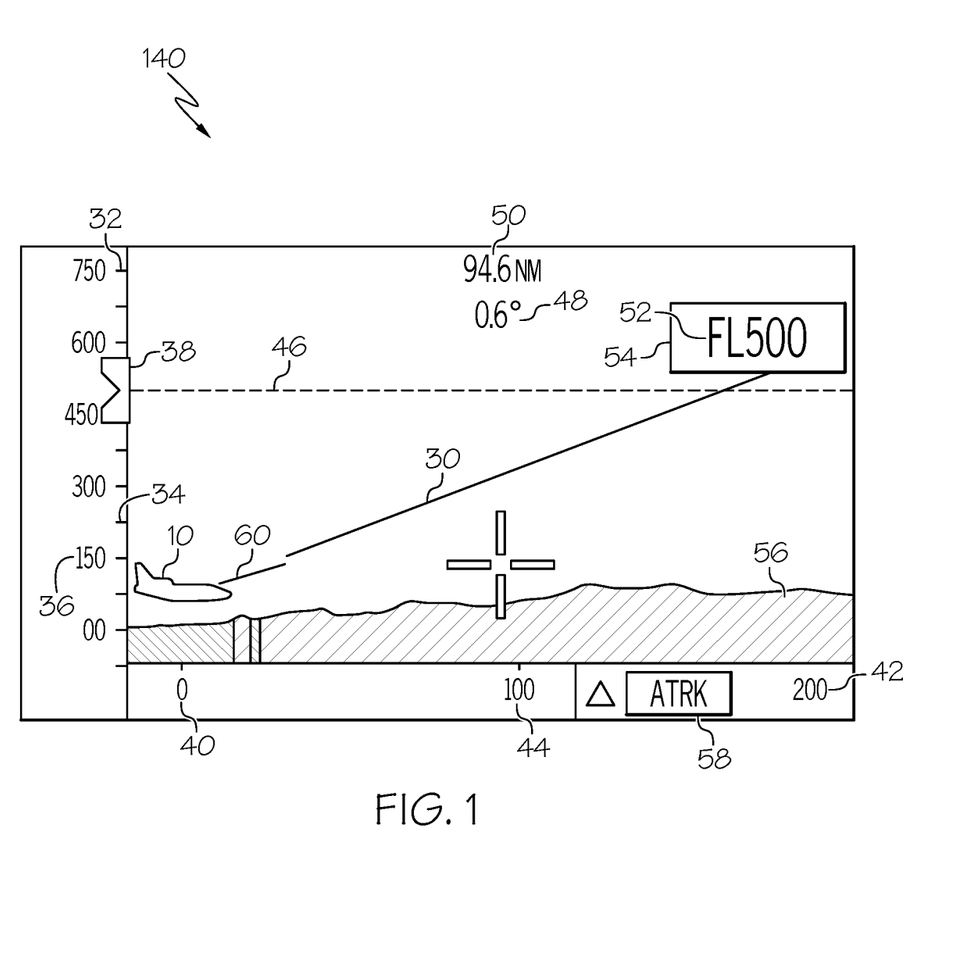
FIG. 1 is a diagrammatic representation of a vertical situation display (VSD)

Referring now to FIG. 1, an example of a display 140 of a display device 100 (FIG. 6) is shown.

The display 140, for example a VSD, provides a vertical profile along the commanded flight path 30 in relation to the terrain or geometric altitude 56. Depending on the vertical VSD range 32, VSD 140 shows a tactical view or a strategic view. At lower VSD ranges, the tactical view is shown by having the VSD maintain a constant aspect ratio by compensating the altitude scale with range so that the slope of the flight plan line does not get altered with a change in range. At higher VSD ranges, the strategic view is shown by having the VSD cover the altitude constraint of the highest waypoint in the flight plan so that the entire flight plan profile is shown and is not clipped. The VSD 140 may also have various modes such as Auto Track, Auto Flight plan, Manual Track, and Manual Flight plan. The pilot may manually enable one of these modes as required for the current phase of flight, but the VSD displayed altitude scale will always be as above depending on whether it is in strategic or tactical view.

FIG. 1 demonstrates the various features included in the VSD display 140. Basically, an aircraft reference 10 is shown with a commanded flight path 30 and an actual flight path 60 in relation to the VSD terrain 56. The aircraft reference 10 indicates the current position of the aircraft. The Y-axis, also referred to as vertical VSD range 32, is marked with VSD altitude tape increment tick marks and VSD altitude tape sub increment tick marks 34 and VSD altitude tape numeric digits 36 are provided to indicate the altitude. A selected altitude bug 38 is provided that is movable in the vertical direction along the Y-axis to indicate a selected altitude. A selected altitude vector 46, for example, a dashed line, indicates the selected altitude of the altitude bug 38.

The X-axis (horizontal axis) indicates the minimum VSD X-range 40, the maximum VSD X-range 42, and the center VSD X-range 44. On the upper edge of the display 140, a cursor angle 48 (with the current value 0.6°) and a cursor distance 50 (with the current value 94.6 NM) are displayed. A selected altitude readout box 54 with the selected altitude readout 52 are displayed in the top right corner of the display 140. Last, a VSD mode display 58 is provided and indicates the current mode of the display 140.

Uplink weather provides data to the aircraft for 3D forecast products. In various embodiments, the data is provided in 3,000 ft blocks, where every 3,000 feet the data may indicate the presence or absence of a particular weather phenomena. Streaming weather data from a service such as XM also provide three-dimensional data at progressive altitudes. The 3D forecast products that may be provided in this format include products such as clear air turbulence (CAT), wind, icing, and temperatures. In various embodiments, CAT and icing are presented on the lateral map as colored areas where the phenomena is forecast to occur. If an attempt were made to present this same colored area on the current VSD, the information would appear as small rectangular blocks (due to tight altitude scale restrictions) (see FIG. 2). This specific data format makes discerning detail between flight levels and phenomena very difficult because the pilot cannot focus on specific flight levels.

Figure 2:
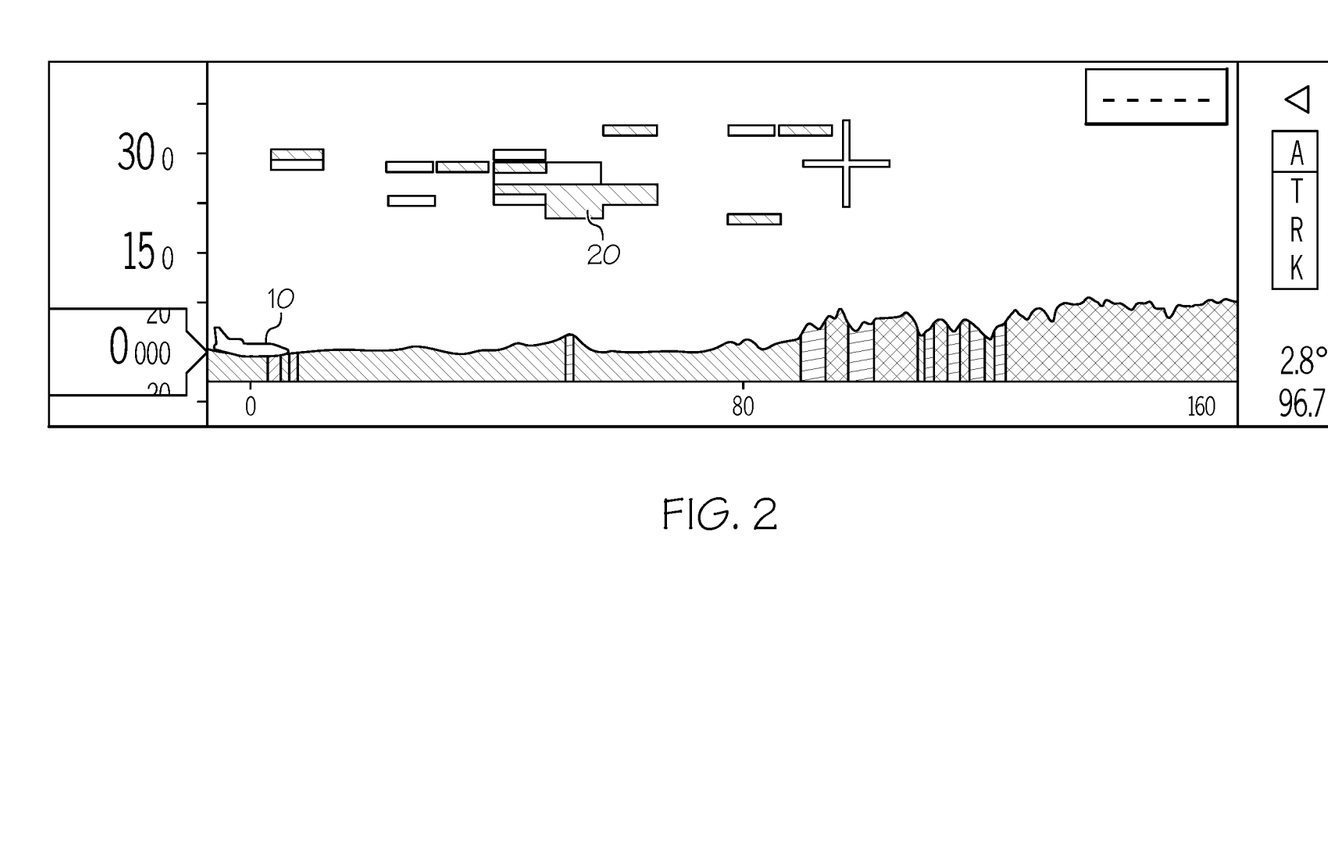
FIG. 2 is a diagrammatic representation of a VSD with an aircraft reference and weather characteristics.

FIG. 2 shows a VSD with an aircraft reference 10 and several weather characteristics 20, each indicated as a block. The commanded flight path is not shown in FIG. 2. However, with reference to FIG. 1, it can be clearly seen that a commanded flight path 30 overlapping the weather characteristics blocks 20 can be used by an operator to determine whether or not the flight path crosses one of the indicated weather characteristic blocks 20.

Figure 3:
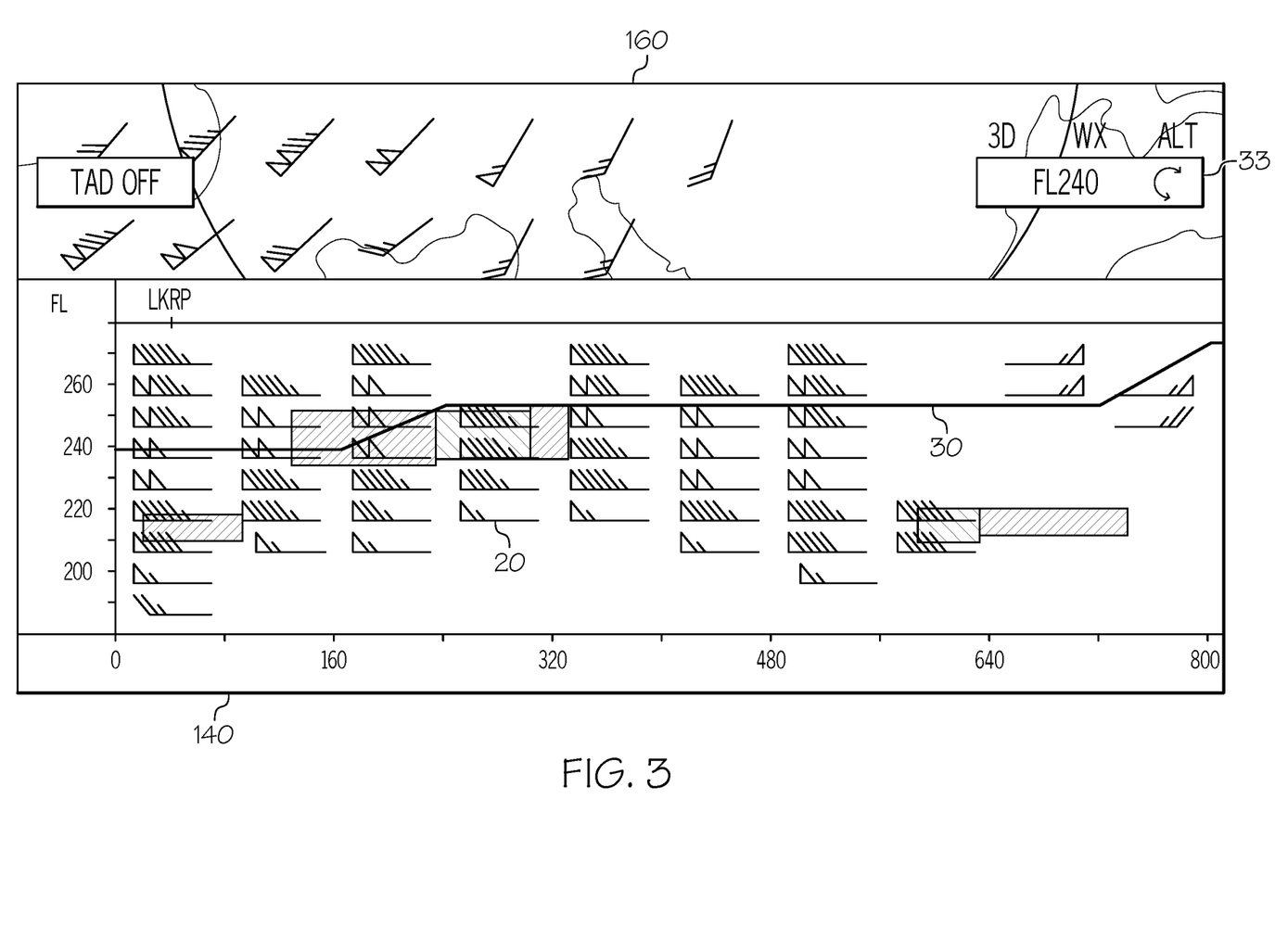
FIG. 3 is a diagrammatic representation of a VSD belonging to a display device in accordance with some embodiments.

FIG. 3 shows a VSD 140 with an example vertical representation of forecast weather 20 with a flight plan line 30. In addition to the flight plan and the weather characteristics, a portion of a lateral map is shown at the top of the schematic representation in FIG. 3. An altitude widget 33 on the lower right of the lateral map indicates the altitude being displayed at the center of the Y-axis, in this case it is the value 240.

Figure 4:
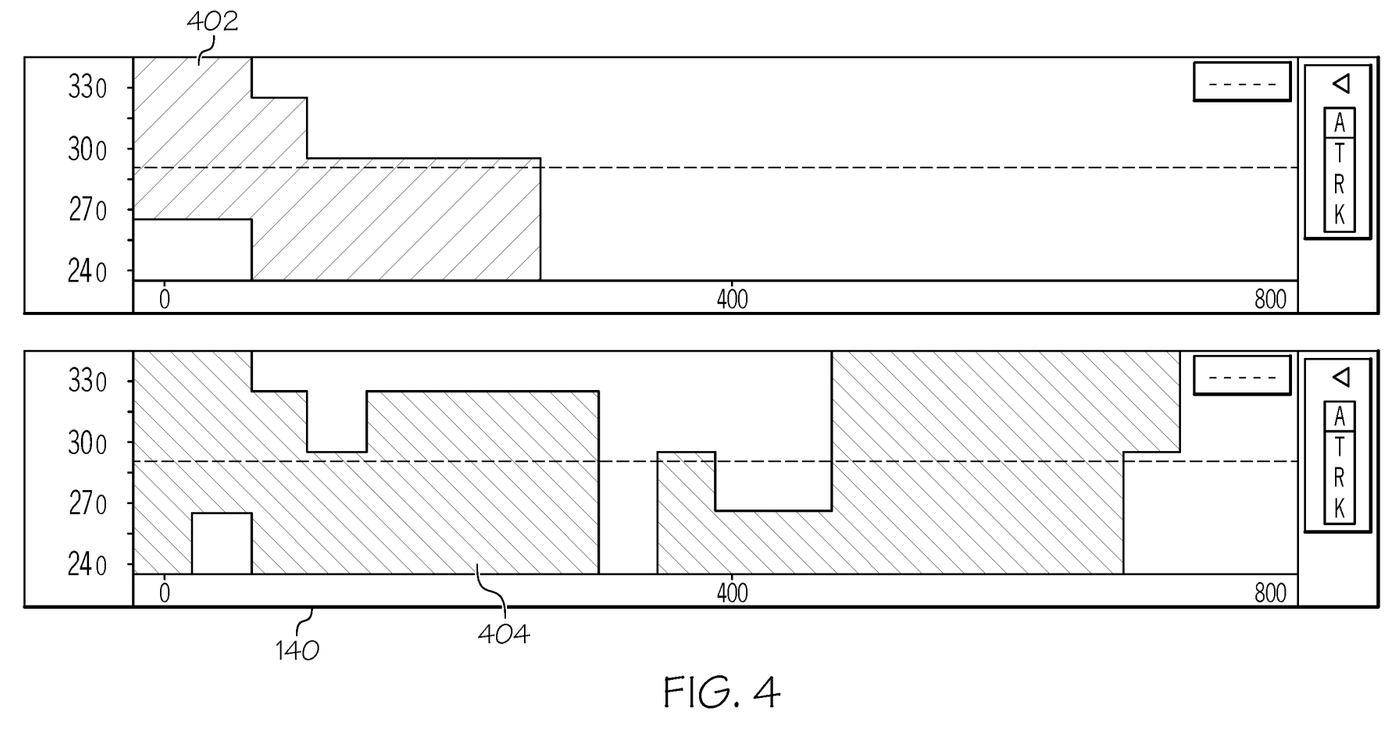
FIG. 4 is a diagrammatic representation of a VSD belonging to a display device in accordance with some embodiments.

FIG. 4 shows two examples of displayed VSD 140 content. The upper example shows icing phenomena 402 with regard to a selected altitude range on the Y-axis and the lower diagram shows CAT 404 with regard to the selected altitude range.

Figure 5:
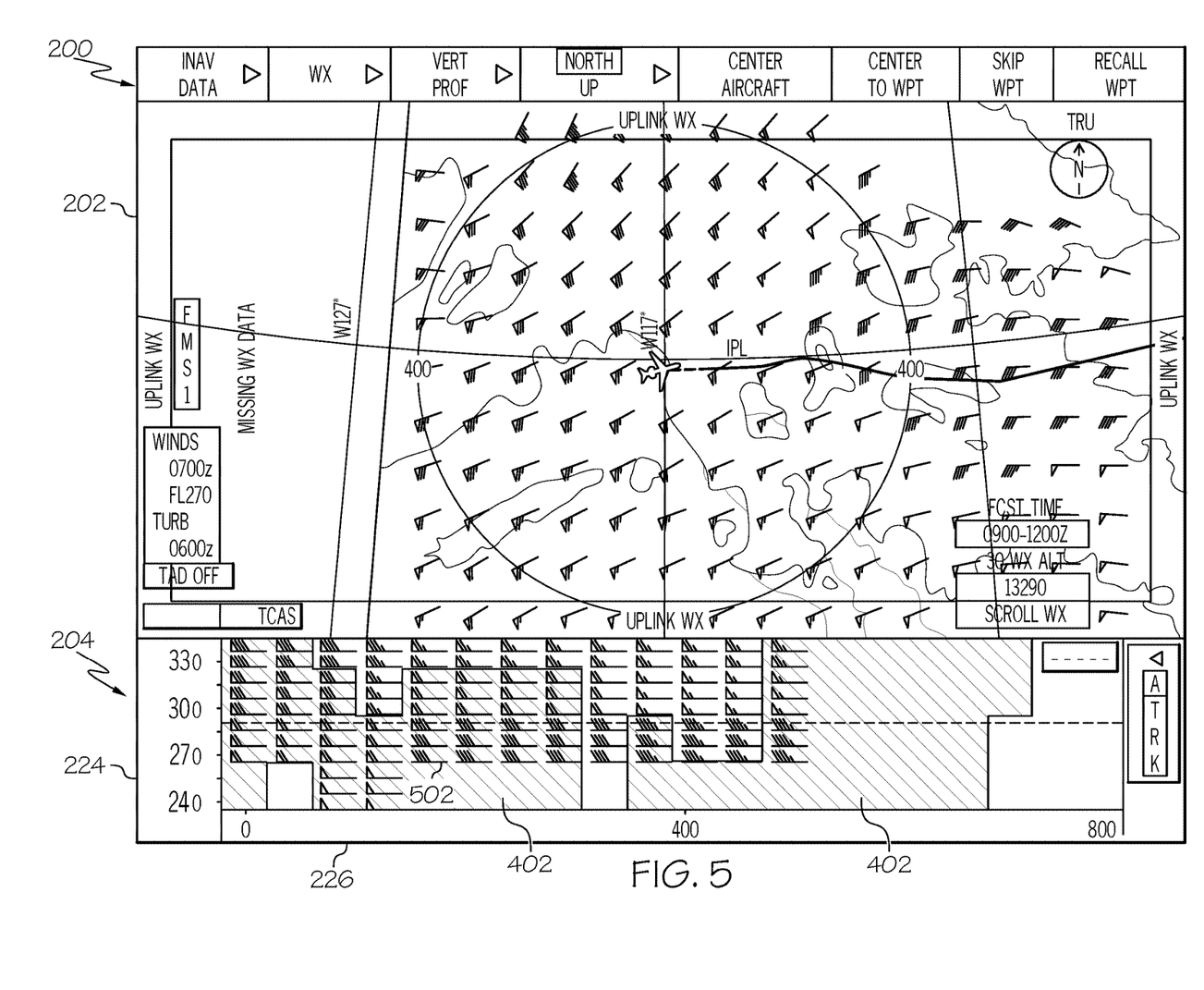
FIG. 5 is a diagrammatic representation of a VSD belonging to a display device in accordance with some embodiments.

FIG. 5 indicates combination of wind 502 and CAT 404 in the VSD 140 together with a lateral map. Although the flight plan line and aircraft reference are not indicated in FIG. 5, these are of course included and are omitted in the drawing for a better overview of the indicated features.

Figure 6:
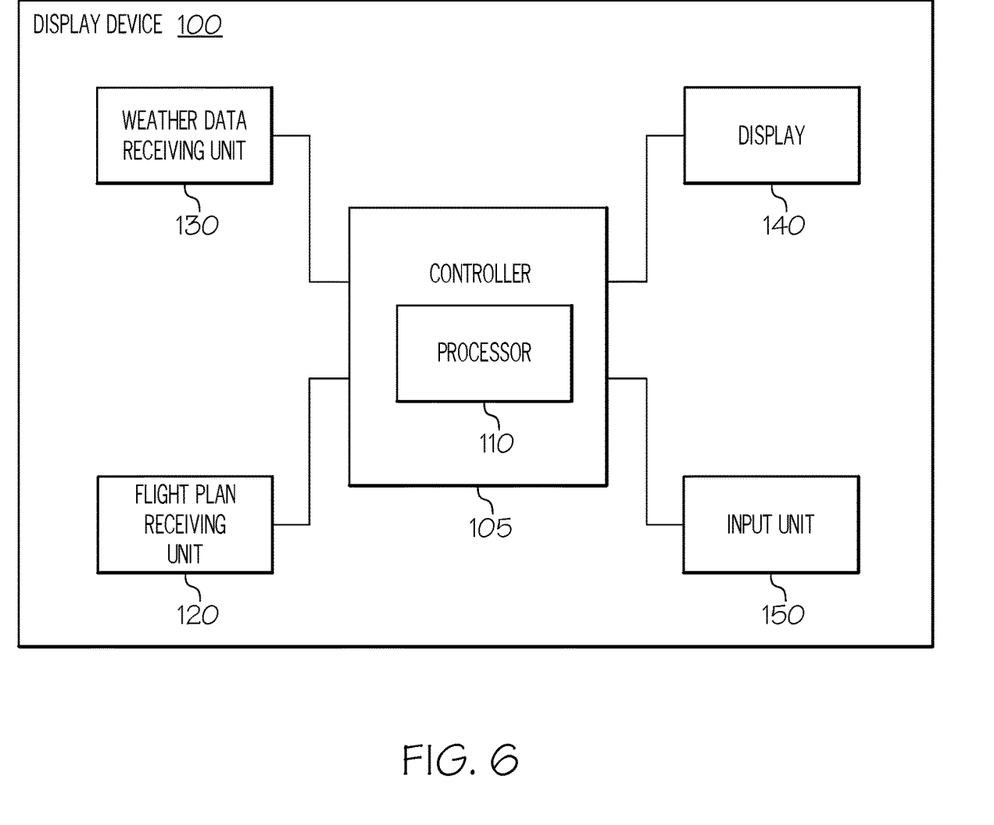
FIG. 6 is a diagrammatic representation of a display device and its components in accordance with some embodiments.

FIG. 6 shows a display device 100 in accordance with various embodiments. The display device 100 includes a weather data receiving unit 130, a flight plan receiving unit 120, a controller 105 with a processor 110, an input unit 150, and a display 140. The processor 110 is configured to receive information, to process the information, and to instruct the display 140 to display information as exemplarily indicated in at least one of the FIGS. 1 to 5. The weather data receiving unit 130 may receive weather data from an external entity (weather data provider) via a communication link (not shown) or from onboard weather determination systems or sensors (not shown). The flight plan receiving unit may be configured to receive flight plan data from an external entity (flight command) or from an operator, i.e., the pilot. The input unit 150 may be configured to allow the pilot communicating with the display device, in particular to input parameters or values which are used by the processor 110 as a basis for providing instructions to the display 140.

The processor 110 may be any one (or a plurality) of numerous known general-purpose microprocessors or application specific processor(s) that operates in response to program instructions. In the depicted embodiment, the processor 110 includes on-board RAM (random access memory), and on-board ROM (read only memory). The program instructions that control the processor 110 may be stored in either or both the RAM and the ROM. For example, the operating system software may be stored in the ROM, whereas various operating mode software routines and various operational parameters may be stored in the RAM. It will be appreciated that this is merely exemplary of one scheme for storing operating system software and software routines, and that various other storage schemes may be implemented. It will also be appreciated that the processor 110 may be implemented using various other circuits, not just a programmable processor. For example, digital logic circuits and analog signal processing circuits could also be used. In this respect, the processor 110 may include or cooperate with any number of software programs (e.g., avionics display programs) or instructions designed to carry out various methods, process tasks, calculations, and control/display functions described herein.

Information from onboard weather radar may be displayed on the VSD 140, but the information is real time and is limited in range and altitude from the position of the aircraft. Streaming or uplink forecast weather provides forecast 3D data over many altitudes regardless of ownship position (current position of aircraft). Weather data is provided to the weather data receiving unit 130 and may be processed by unit 130 to prepare or preprocess the weather data and to provide the weather data to the controller 105. Presenting this information in a readable/usable manner for a human operator may be a key factor in strategic flight planning and altitude selection as the pilots attempt to avoid severe weather that may disrupt flights or even create serious safety hazards.

The weather radar referred to herein may be part of onboard data sources. The data sources supply the above-mentioned data to the processor 110. The data sources may include a wide variety of informational systems, which may reside onboard the aircraft or at a remote location. By way of example, the data sources may include one or more of a runway awareness and advisory system, an instrument landing system, a flight director system, a terrain avoidance and warning system, a traffic and collision avoidance system, a terrain database, an inertial reference system, a navigational database, and a flight management system. The weather radar or, generally, a weather data system, may be provided by, for example, an uplink weather data service. As is generally known, uplink weather data services provide three-dimensional weather data to aircraft. Typically, the weather data is provided at various altitude segments, such as 3,000 foot segments, and each segment may indicate the presence or absence of particular weather phenomena. The weather phenomena associated with the data include, but are not limited to, clear air turbulence (CAT), wind, icing, and temperatures.

The input unit 150 is in operable communication with the processor 110 and is configured to receive input from a user (e.g., a pilot) and, in response to the user input, supply command signals to the processor 110. The input unit 150 may be any one, or combination, of various known user interface devices including, but not limited to, a cursor control device (CCD), such as a mouse, a trackball, or joystick, and/or a keyboard, one or more buttons, switches, or knobs.

The display 140 is used to display various images and data, in a graphic, iconic, and a textual format, and to supply visual feedback to the user. It will be appreciated that the display 140 may be implemented using any one of numerous known displays suitable for rendering graphic, iconic, and/or text data in a format viewable by the user. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, display 140 includes a panel display. It is further noted that the display device 100 could be implemented with more than one display device 140. For example, the display device 100 could be implemented with two or more displays 140.

No matter the number or particular type of display that is used to implement the display 140, it was noted above that the processor 110 is responsive to the various data it receives to render various images on the display 140. The images that the processor 110 renders on the display 140 will depend, for example, on the type of display being implemented. For example, the display 140 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. The display device 140 may also be implemented in an electronic flight bag (EFB) and, in some instance, some or all of the display device 100 may be implemented in an EFB.

Referring again to FIG. 5, an exemplary image 200 that may be rendered on the display 140 when it is implementing a MFD is depicted and will now be described. Before doing so, it is noted that the depicted MFD image 200 is merely exemplary of one embodiment, and that it could be variously implemented. It is additionally noted that not all of the rendered images that are depicted in FIG. 5 will be described, and that various other images that are not depicted in FIG. 5 (or further described) could be rendered on the on display 140, if needed or desired.

The depicted MFD image 200 is rendered to simultaneously display a lateral map 202 and a vertical profile 204. The lateral map 202 includes a top-down aircraft symbol, one or more waypoint symbols, line segments that interconnect the waypoint symbols, and one or more range rings. The lateral map 202 also preferably includes various map features including, but not limited to, terrain, political boundaries, and navigation aids, which, for clarity, are not shown in FIG. 5. The top-down aircraft symbol is rendered at a position that is representative of aircraft position relative to the desired course. The range rings, only one of which is shown in FIG. 5, indicate nautical distance from the top-down aircraft symbol. In the illustrated embodiment, the range ring includes a range indicator, which displays the lateral distance from the aircraft's present position to the position on the lateral map 202 that corresponds to the range ring (e.g., 50 nautical miles).

Turning now to the vertical profile 204, this portion of the rendered image 200 includes weather information like icing phenomena 402, wind 502, a vertical axis 224, and a horizontal axis 226. The vertical axis 224 represents aircraft altitude and is suitably graduated with altitude values, and the horizontal axis 226 represents aircraft lateral position and is suitably graduated with lateral distance values. It will be appreciated that the horizontal axis 226 could alternatively be graduated with time values in addition to, or instead of, lateral distance values.

As noted above, the data sources may include a weather data system. The processor 110 is coupled to receive weather data supplied by the weather data system. The processor 110, upon receipt of the weather data, supplies image rendering display commands to the display 140 that causes the display 140 to render images representative of various weather phenomena, such as CAT and icing, on both the lateral map 202 and the vertical profile 204. The manner in which such phenomena may be rendered on the vertical profile 204 will now be described. In doing so, reference should be made to FIGS. 1-5, which provide detailed representations of how the processor 110 commands the vertical profile 204 to display weather data.

As depicted in FIGS. 1-5, unlike the current functionality associated with the vertical profile 204, which displays an altitude window governed either by aspect ratio (tactical view) or waypoint altitude constraints (strategic view), the processor 110 can be configured to command the y-axis (vertical axis) of the vertical profile 204 to be rendered with a 10,000-foot altitude window around a selected altitude—5,000 feet above and 5,000 feet below the selected altitude. To do so, the pilot can adjust, via, for example, the input unit 150, the selected altitude that will be the center of the vertical axis. In the depicted embodiment, a relatively thin line 46 (which may be dotted/dashed in some embodiments, FIG. 1) is rendered at the selected altitude value as a means of reference. The processor 110 may command the display 140 to render an altitude widget 33 (see FIG. 3) on the lateral map 202 that controls the displayed altitude for all selected forecast weather products on the lateral map 202 and vertical profile 204. In this manner, all displayed forecast products are presenting information at the same altitude values.

The display device 100 design proposed herein and exemplarily described with reference to FIGS. 1 to 5 provides an interactive vertical presentation of weather, flight plan, and ownship designed to enhance awareness of forecast weather locations and aid strategic flight planning.

With additional reference to FIGS. 1 to 5, in various embodiments, the Y-axis of the vertical display 140 will show an altitude window of a predetermined range above and below a chosen altitude, for example 5,000 feet above and 5,000 feet below the chosen altitude, i.e., a window of 10,000 feet total. A pilot may choose an altitude and the size of the window by providing a corresponding input via the input unit 150. In other words, an altitude window is neither governed by aspect ratio (tactical view) nor by waypoint altitude constraints (strategic view), but based on values input by the pilot.

In various embodiments, the pilot can adjust the selected altitude (this may be the center of the Y-axis or the center of the vertical VSD range 32, see FIG. 1 or FIG. 3) in the vertical window of display 140. The altitude may be set with an altitude widget in the lateral map 160 (FIG. 3) that controls the displayed altitude for all selected forecast weather products on the lateral display 160 (FIG. 3) and vertical display 140. Thus, preferably all displayed forecast products are presenting information at the same altitude values. A thin, dotted/dashed line, the selected altitude vector 46 (FIG. 1), will be present across the VSD 140 at the selected altitude value as a means of reference.

The commanded flight path 30 may not be shown on the vertical display 140 if the pilot has selected an altitude window where his flight path is not currently projected, but the pilot can increase or decrease the selected altitude to display the path. The ownship (aircraft reference 10) will be shown in the vertical display 140 or a ghosted ownship symbol will be presented if the ownship is out of the displayed altitude window, i.e., out of the selected altitude range.

In various embodiments, the vertical display of uplink or streaming weather is a separate, individual mode of the current VSD to allow it to follow different conventions than the strategic or tactical view of the current VSD.

In various embodiments, selecting the forecast weather product in a single location, a dropdown menu on the lateral INAV map, will allow that same weather product to be displayed on the vertical display if the pilot selects the vertical weather mode for the VSD 140.

In various embodiments, the display device 100 described herein provides a more representative vertical view of forecast weather at distinct altitudes, allows the pilot to have full control over altitude scale by allowing the pilot to view weather at specific altitudes above and below the flight path, and improves strategic planning by aiding the pilot in selecting flight altitudes where severe weather is not forecasted or by allowing the pilot to prepare for specific weather phenomena during certain phases of flight such as descent.

In various embodiments and with reference to FIG. 6, a display device 100 for receiving and processing weather data and flight plan data is provided. The display device 100 comprises a first display 140, configured to display weather data and flight plan data, an input unit 150, configured to receive an input value from an operator, wherein the input value is a flight altitude value, and a processor 110. Preferably, the processor 110 is part of a controller 105 that functionally encapsulates the processor 110 and provides interfaces that enable the processor to receive and transmit data to and from peripheral devices of the display device 100, such as a weather data receiving unit 130, a flight plan receiving unit 120, the first display 140, and the input unit 150. The processor is configured to receive flight plan data containing at least a moving path of an aircraft from the flight plan receiving unit 120, to receive weather data containing at least positional information and weather characteristics belonging to said positional information from the weather data receiving unit 130, to determine, based on the positional information of the weather data, which weather characteristics is located within a predetermined range of the input flight altitude value, to instruct the first display 140 to display those weather data which are located within the predetermined range above and below the input flight altitude value together with the flight plan data, and to instruct the first display 140 to additionally display at least one element of the group consisting of the elements: strategic information weather, uplink weather, weather information from external weather data provider, onboard weather radar information, notice to airmen, aeronautical information service data, terminal area forecast, air-traffic related information.

Thus, the display device 100 allows various different information being displayed on the same display 140. The possible information to display include: strategic weather information including uplink weather, XM and S-XM weather or any other strategic weather sources; onboard weather radar information; D-NOTAM, TAF, airspaces, oceanic tracks, and any other AIS information; traffic related information; and any information that can be created by synthesis of the mentioned data, their combination or combination of their subsets or sub-selection of the data. One benefit of this approach lays in more versatile usage of a display device 100, especially of the display 140 and the available display surface of display 140 by presenting the information in a more efficient manner, for example at a reduced presentation area, increased situation awareness thanks to provision of broader set of information and opportunity for further data fusion and filtering. However, at the same time, the advantage of displaying only a predetermined and selectable segment of a vertical range of the flight path remains.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As referred to herein, flight plan data may contain position information of an aircraft together with a time stamp indicating the position of the aircraft at given times. Weather data may contain any kind of weather information, specifically information containing positional information and weather characteristics, wherein positional information of weather data especially relate to position, expansion, moving direction of regions having a specific weather condition, and wherein weather characteristics especially relate to temperature, wind speed, wind direction.

In various embodiments, the processor 110 is configured to instruct the first display 140 to display a combination of at least two elements of the group consisting of the elements: strategic information weather, uplink weather, weather information from external weather data provider, onboard weather radar information, notice to airmen, aeronautical information service data, terminal area forecast, air-traffic related information. In this embodiment, an operator may choose two or more of the elements of the indicated group to be displayed on the first display 140. The operator may provide a selection value via the input unit 150 or via a touch sensitive area of the first display 140.

In various embodiments, the processor 110 is configured to determine continuous areas (such as weather characteristics 20 shown in FIG. 2, for example) and to instruct the first display to display the information based on these continuous areas. Thus, the display 140 does not display only discrete samples of data, but enables displaying of any data type. The display 140 displays continuous areas defined by vector shape, raster data or any other means, lines, symbols, text or any combination thereof.

In various embodiments, the processor 110 is configured to define the continuous areas by at least one of vector shape, raster data, lines, symbols, text.

In various embodiments, the processor 110 is configured to define the continuous areas by a combination of at least two of vector shape, raster data, lines, symbols, text.

In various embodiments, the weather data contain positional information of weather characteristics, wherein the positional information contains at least one of a position, expansion, moving direction of a region having a specific and/or substantially homogeneous weather condition.

In various embodiments, the weather characteristics relate to at least one or a combination of temperature, wind, wind direction, wind speed.

In various embodiments, the predetermined range of the input flight altitude value is a vertical range. The vertical range may be input by the pilot of an aircraft. Thus, the pilot is enabled to choose that vertical range of the commanded flight plan he or she wishes or need to focus on.

In various embodiments, the vertical range is smaller than a maximum vertical range between take-off and maximum flight altitude of an aircraft. This allows the pilot to select a range of the maximum vertical range so that the selected vertical range has an advantageous enlargement factor and enables the weather characteristics being displayed in a more precise manner.

In various embodiments, the display device 100 schematically shown in FIG. 6 is configured to display content as exemplarily shown in FIGS. 1 to 5. The processor 110 is configured to instruct the display 140 accordingly.

In various embodiments, an aircraft is provided that includes a display device 100 as schematically shown in FIG. 6. The display device 100 may be arranged in a cockpit of the aircraft to provide the pilot with the desired information.

Figure 7:
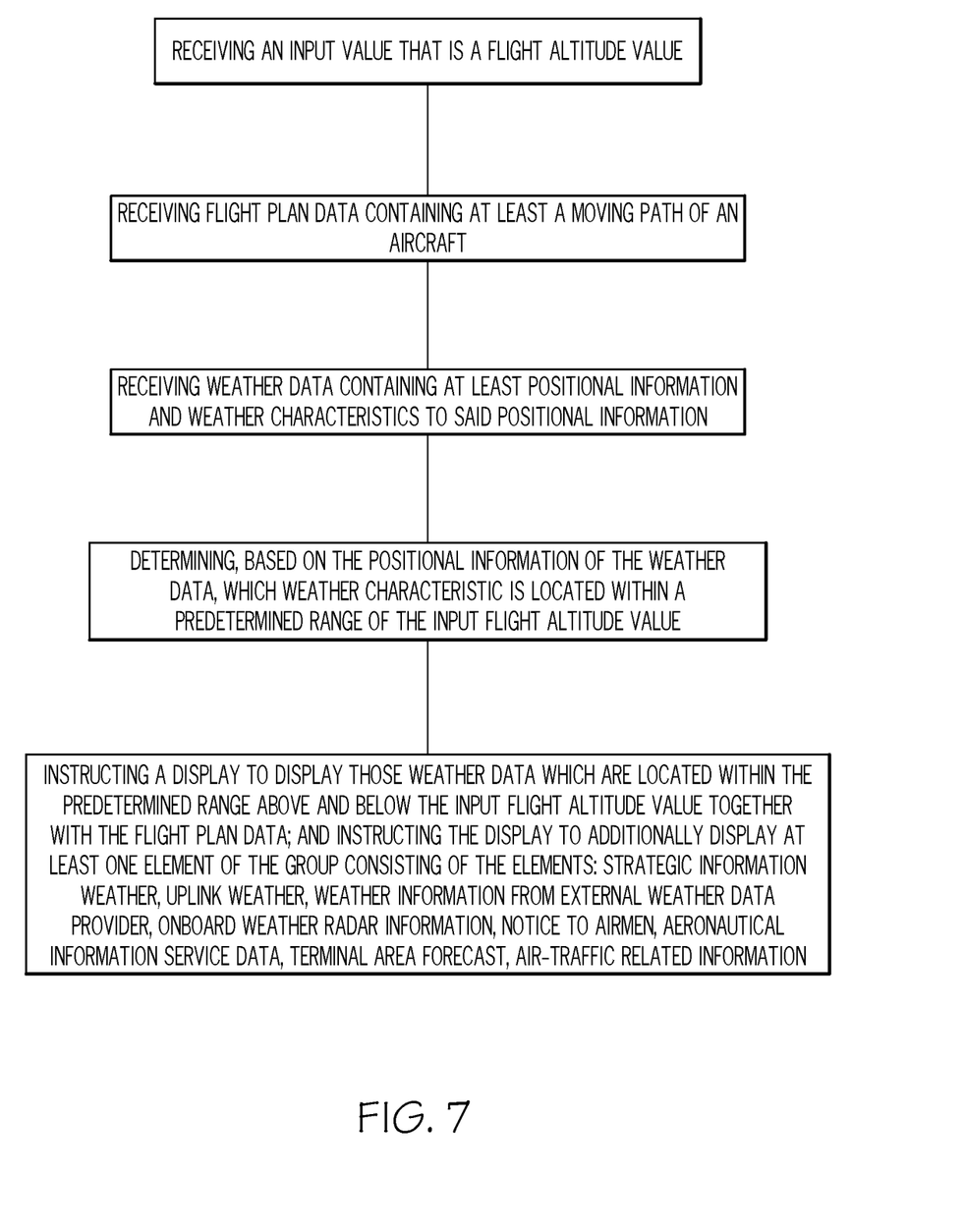
FIG. 7 is a schematic representation of a method in accordance with some embodiments.

FIG. 7 schematically shows steps of a method for processing and displaying weather data and flight plan data in an aircraft in accordance with various embodiments. The method includes the following steps: in a first step, receiving an input value that is a flight altitude value; in a second step (subsequently, prior to, or concurrently to the first step), receiving flight plan data containing at least a moving path of an aircraft; in a third step; in a third step (subsequently, prior to, or concurrently to the first and second steps) receiving weather data containing at least positional information and weather characteristics belonging to said positional information; in a fourth step (subsequently to the first, second, and third steps) determining, based on the positional information of the weather data, which weather characteristics is located within a predetermined range of the input flight altitude value; and in a fifth step (subsequently to the fourth step) instructing a display 140 to display those weather data which are located within the predetermined range above and below the input flight altitude value together with the flight plan data and instructing the display 140 to additionally display at least one element of the group consisting of the elements: strategic information weather, uplink weather, weather information from external weather data provider, onboard weather radar information, notice to airmen, aeronautical information service data, terminal area forecast, air-traffic related information.

In various embodiments, the display device 100 shown in FIG. 6 implements the method steps described with reference to FIG. 7.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display device for receiving and processing weather data and flight plan data, comprising:
    a vertical situation display, configured to display a vertical profile of weather data along a commanded flight plan;
    an input unit, configured to receive an input value from an operator, wherein the input value is a flight altitude value and a size of an altitude window that corresponds to an altitude range above and below the flight altitude value;
    a processor in operable communication with the vertical situation display and the input unit, the processor configured to:
        receive flight plan data containing at least the commanded flight plan of an aircraft;
        receive weather data containing at least positional information and weather characteristics belonging to said positional information;
        determine, based on the positional information of the weather data, which weather characteristics are located within the altitude window that corresponds to the altitude range above and below the flight altitude value;
        instruct the vertical situation display to display a vertical profile of those weather data which are located within the altitude window that corresponds to the altitude range above and below the flight altitude value;
        instruct the vertical situation display to additionally display at least one element of the group consisting of the elements: strategic information weather, uplink weather, weather information from external weather data provider, onboard weather radar information, notice to airmen, aeronautical information service data, terminal area forecast, air-traffic related information;
        determine continuous areas that are defined by a combination of at least two of vector shape, raster data, lines, symbols, and text; and
        instruct the vertical situation display to display the at least one element based on these continuous areas,
        wherein the altitude window that corresponds to the altitude range above and below the flight altitude value is smaller than a maximum vertical range between take-off and maximum flight altitude of an aircraft.

2. The display device of claim 1,
    wherein the processor is configured to instruct the vertical situation display to display a combination of at least two elements of the group consisting of the elements: strategic information weather, uplink weather, weather information from external weather data provider, onboard weather radar information, notice to airmen, aeronautical information service data, terminal area forecast, air-traffic related information.

3. The display device of claim 1,
    wherein the weather data contain positional information of weather characteristics,
    wherein the positional information contains at least one of a position, expansion, moving direction of a region having a specific and/or substantially homogeneous weather condition.

4. The display device of claim 1,
    wherein the weather characteristics relate to at least one or a combination of temperature, wind, wind direction, wind speed.

5. An aircraft, comprising a display device for receiving and processing weather data and flight plan data, the display device comprising:
    a vertical situation display, configured to display a vertical profile of weather data along a commanded flight plan;
    an input unit, configured to receive an input value from an operator, wherein the input value is a flight altitude value and a size of an altitude window that corresponds to an altitude range above and below the flight altitude value;
    a processor in operable communication with the vertical situation display and the input unit, the processor configured to:
        receive flight plan data containing at least the commanded flight plan of an aircraft;
        receive weather data containing at least positional information and weather characteristics belonging to said positional information;
        determine, based on the positional information of the weather data, which weather characteristics are located within the altitude window that corresponds to the altitude range above and below the flight altitude value;

instruct the vertical situation display to display a vertical profile of those weather data which are located within the altitude window that corresponds to the altitude range above and below the flight altitude value;

instruct the vertical situation display to additionally display at least one element of the group consisting of the elements: strategic information weather, uplink weather, weather information from external weather data provider, onboard weather radar information, notice to airmen, aeronautical information service data, terminal area forecast, air-traffic related information;

determine continuous areas that are defined by a combination of at least two of vector shape, raster data, lines, symbols, and text; and instruct the vertical situation display to display the at least one element based on these continuous areas, wherein the altitude window that corresponds to the altitude range above and below the flight altitude value is smaller than a maximum vertical range between take-off and maximum flight altitude of an aircraft.

6. The aircraft of claim 5,
wherein the processor is configured to instruct the first display to display a combination of at least two elements of the group consisting of the elements: strategic information weather, uplink weather, weather information from external weather data provider, onboard weather radar information, notice to airmen, aeronautical information service data, terminal area forecast, air-traffic related information.

7. The aircraft of claim 5,
wherein the weather data contain positional information of weather characteristics,
wherein the positional information contains at least one of a position, expansion, moving direction of a region having a specific and/or substantially homogeneous weather condition.

8. The aircraft of claim 5,
wherein the weather characteristics relate to at least one or a combination of temperature, wind, wind direction, wind speed.

9. A method for processing and displaying weather data and flight plan data in an aircraft, the method comprising:
receiving an input value that is a flight altitude value and a size of an altitude window that corresponds to an altitude range above and below the flight altitude value;

receiving flight plan data containing at least a commanded flight plan of an aircraft;

receiving weather data containing at least positional information and weather characteristics belonging to said positional information;

determining, based on the positional information of the weather data, which weather characteristics are located within the altitude window that corresponds to the altitude range above and below the flight altitude value;

instructing a vertical situation display to display a vertical profile of those weather data which are located within the altitude window that corresponds to the altitude range above and below the flight altitude value;

instructing the vertical situation display to additionally display at least one element of the group consisting of the elements: strategic information weather, uplink weather, weather information from external weather data provider, onboard weather radar information, notice to airmen, aeronautical information service data, terminal area forecast, air-traffic related information;

determining continuous areas that are defined by a combination of at least two of vector shape, raster data, lines, symbols, and text; and instructing the vertical situation display to display the at least one element based on these continuous areas, wherein the altitude window that corresponds to the altitude range above and below the flight altitude value is smaller than a maximum vertical range between take-off and maximum flight altitude of an aircraft.

* * * * *